July 30, 1963  C. E. WAGNER ETAL  3,099,433
METHOD AND MEANS FOR BRAKING AND REVERSING A GAS TURBINE ROTOR
Filed May 8, 1961  2 Sheets-Sheet 2

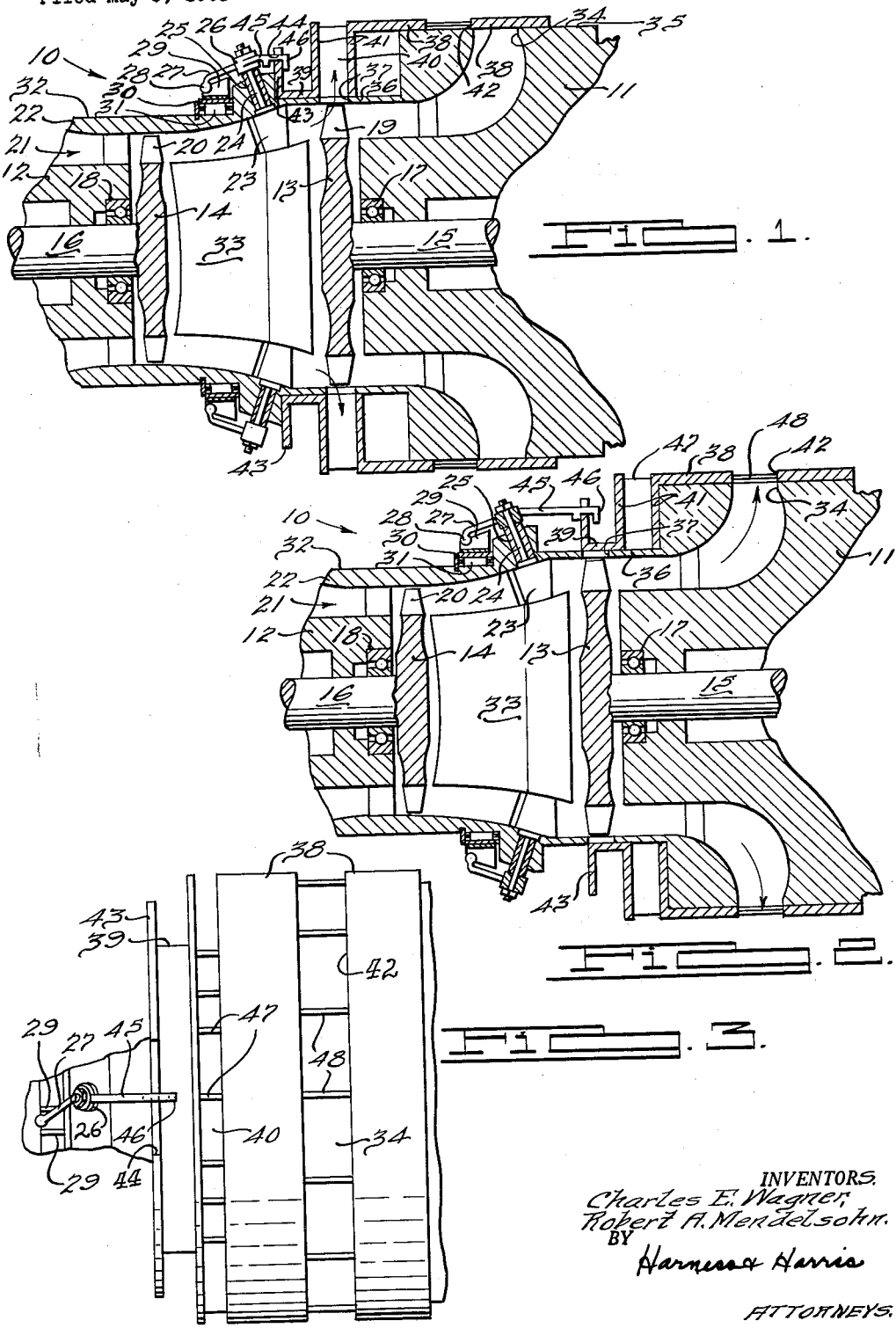

INVENTORS.
Charles E. Wagner,
Robert A. Mendelsohn
BY
Harness & Harris
ATTORNEYS

United States Patent Office 3,099,433
Patented July 30, 1963

3,099,433
METHOD AND MEANS FOR BRAKING AND REVERSING A GAS TURBINE ROTOR
Charles E. Wagner and Robert A. Mendelsohn, Detroit, Mich., assignors to Chrysler Corporation, Highland Park, Mich., a corporation of Delaware
Filed May 8, 1961, Ser. No. 108,566
11 Claims. (Cl. 253—59)

This invention is concerned with an improved method and means for imparting engine drag or a reverse drive to the power rotor of a gas turbine engine, particularly for automotive use.

In a conventional type of automotive gas turbine engine, a compressor driving rotor and a power rotor are arranged coaxially in tandem in the axial flow of motive gases to be driven thereby, the power rotor being suitably connected through speed reducing means to the driving wheels of the automobile. Arranged coaxially between the two rotors and immediately in advance of the peripheral blades of the power rotor are a plurality of adjustable nozzles for directing the angle of attack of the motive gases against the power rotor blades so as to prorate the available power selectively to the two rotors.

In the ordinary forward operation of such an engine, the nozzles are adjusted to direct a forward driving thrust against the blades of the power rotor. As the gases flow axially past and rebound from the rotor blades, an additional forward driving thrust is imparted thereto. Even when the nozzles are adjusted to a "reverse" position to impart an initial reverse driving thrust to the rotor blades during engine braking, the rebound of the axially flowing motive gases from the rotor blades imparts a forward driving thrust thereto which substantially neutralizes the initial reverse thrust. In consequence, the engine braking is inefficient and an actual reverse rotation of the rotor is rendered particularly difficult. The latter is true because the nozzles and rotor blades are designed for efficient forward driving and the initial reverse thrust imparted to the rotor blades for the purpose of engine braking when the nozzles are adjusted to a reverse position is largely dependent upon the speed of forward rotation of the rotor relative to the motive gases. As the rotor speed is retarded, the initially imparted reverse thrust decreases. It is not feasible to reverse the nozzles sufficiently to obtain a net reverse driving thrust from the axially flowing motive gases, particularly at high velocity gas flow, because such a nozzle adjustment would result in too great a back pressure on the motive gases and would give rise to violent vibration known as surge.

An important concept of the present invention is to selectively exhaust the motive gases radially from the power rotor blades of an engine as described so as to avoid the forward thrust that would otherwise be imparted to the rotor blades upon rebound of the motive gases therefrom. In consequence, an engine drag can be effected without adjusting the nozzles to the reverse position and engine braking is materially enhanced when the nozzles are adjusted to the reverse position. Furthermore, by exhausting the motive gases radially, the customary back pressure can be reduced. Thus the nozzles can be adjusted to a more extreme reverse position without causing surge conditions. The latter effect in cooperation with elimination of the forward thrust resulting from the rebound of the axially flowing motive gases enables a reasonably efficient reverse drive for the power rotor that has not been practicable heretofore.

Although the concept of the present invention is illustrated by means of an axial flow gas driven rotor, it will be apparent to those skilled in the art that the same principle of engine braking taught herein applies with equal validity to radial flow type rotors wherein the driving motive gases are either received or discharged radially with respect to the axis of rotation of the rotor, or to the conical or mixed flow type rotor wherein the flow path of the motive gases past the rotor is at an intermediate angle oblique to the axis of rotation. In any case, similarly to the axial flow type rotor, when engine braking is desired, the motive gases are exhausted substantially perpendicularly to the usual flow path that is provided for these gases to effect forward power operation of the rotor.

It is of course essential in the above regard that the motive gases be exhausted perpendicularly as aforesaid during their passage by the driven rotor. Otherwise once the motive gases leave the rotor, their rebound reaction on the rotor will be complete and the mode of exhaust will be relatively ineffective.

Also similarly to the axial flow type rotor, where enhanced braking or actual reverse driving is desired with the radial or mixed flow type rotor, adjustable nozzles will be employed to direct the motive gases against the rotor to impart an initial reverse thrust thereto. The adjustable nozzles will be employed in cooperation with the exhausting of the motive gases perpendicularly as aforesaid, either with or without the restricting of the aforesaid usual forward drive flow path at a location downstream of the rotor.

It is accordingly an object of the present invention to provide an improved method and apparatus for effecting engine braking and reverse drive for a gas turbine engine wherein at the region of the rotor to be braked or reversed, the motive gases are selectively exhausted perpendicularly to the usual flow path which these gases take when driving the rotor forwardly.

Other objects of this invention will appear in the following description and appended claims, reference being had to the accompanying drawings forming a part of this specification wherein like reference characters designate corresponding parts in the several views.

FIGURE 1 is a fragmentary schematic sectional view through the rotors of a gas turbine engine, taken longitudinally of the axis of rotation and showing the engine in the reverse condition.

FIGURE 2 is a view similar to FIGURE 1, showing the engine in the forward drive condition.

FIGURE 3 is a fragmentary elevational view of FIGURE 2.

Figure 4:
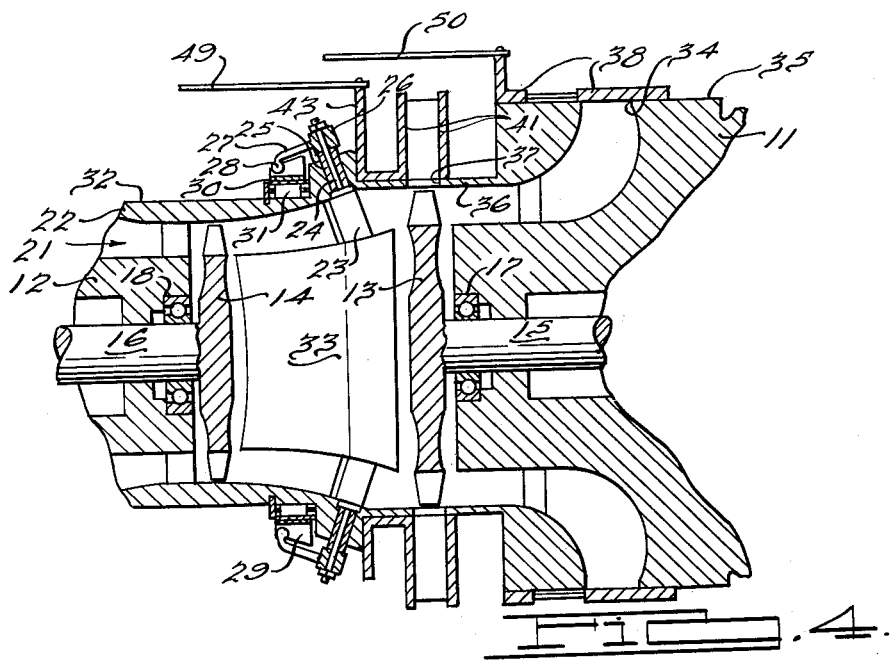
FIGURE 4 is a view similar to FIGURE 1, showing a modification of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to FIGURES 1, 2 and 3, a particular embodiment of the present invention is illustrated by way of example in an axial flow gas turbine engine indicated generally by the numeral 10 and comprising supporting frame or housing portions 11 and 12 for a power rotor 13 and compressor driving rotor 14, respectively. The rotors 13 and 14 are rotatable coaxially with shafts 15 and 16, respectively, suitably journalled in the housing portions 11 and 12 by means of bearings 17 and 18. Arranged around the peripheries of the rotors 13 and 14, respectively, are a plurality of circumferentially spaced blades 19 and 20 located in an annular passageway 21 which conducts motive gases in the direction of the arrows generally axially past the blades 20 and 19 to rotatably drive the rotors 14 and 13. The passageway 21 is formed between the housing portions 11 and 12 and an outer annular shroud 22 coaxial with the rotors 13 and 14.

Located in the passage 21 between the blades 19 and 20 and immediately upstream of the blades 19 are a plurality of circumferentially spaced adjustable nozzles 23. Each nozzle 23 is keyed to a shaft 24 extending generally radially through shroud 22 and journalled therein by means of a bushing 25. The outer end of each shaft 24 is keyed to a hub 26 for rotation therewith and is rotatably adjusted about its longitudinal axis by means of a swinging arm 27 integral with the hub 26. Each arm 27 terminates in an inwardly directed ball portion 28 confined between a pair of parallel axially extending plates 29 suitably secured to a rotatable ring 30 journalled on a plurality of rollers 31 which ride on a cylindrical surface 32 of the shroud 22 coaxial with the rotors 13 and 14. Between the rotors 13 and 14, the passage 21 is completed by an intermediate annular inner shroud 33 suitably supported in position, as for example by struts, not shown, connected with outer shroud 22.

By the structure described, rotation of ring 30 on the rollers 31 will impart swinging motion to the plurality of arms 27 and the associated shafts 24 and nozzles 23, thereby to enable control of the angle of attack of the motive gases against blades 19. Details of the mounting and adjustment of the nozzles 23 are described in copending applications, Serial Numbers 34,172 and 34,296 (now Patent No. 3,074,689 granted Jan. 22, 1963), filed June 6, 1960. In normal operation of the engine during forward drive, the motive gases flowing axially in passage 21 from left to right drive the rotors 14 and 13 by engagement with the blades 20 and 19, respectively, and are finally exhausted via exhaust port 34. In accordance with the angular adjustments of the nozzles 23, the power imparted to the blades 19 and 20 can be suitably prorated. Also, in accordance with the customary practice, by adjusting the nozzles 23 to a "reverse" position the motive gases can be directed against the blades 19 so as to impart a reverse thrust to the latter tending to retard their forward rotation.

In order to increase the effectiveness of engine braking and the reverse thrust on the blades 19, the structure is arranged and operated as follows. An exhaust port 34 opens radially through a cylindrical portion 35 of housing portion 11 coaxial with rotors 13 and 14. A similar coaxial cylindrical portion 36 is provided on outer shroud 22 at the region around the rotor 13. A plurality of circumferentially spaced and radially opening exhaust ports 37 are provided in cylindrical portion 36 adjacent the periphery scribed by the blades 19 for selectively exhausting the motive gases radially from the latter blades as described below. Extending closely around the cylindrical portions 35 and 36 and slidable axially thereon are port closing sleeves 38 and 39, respectively, which are integral with coextensive annular plates 41 spaced axially to provide a radially opening annular exhaust passage 40 adapted to be aligned with port 37 when the engine is in the braking or reverse drive condition of FIGURE 1. Also provided in sleeve 38 are a plurality of circumferentially spaced and radially opening exhaust ports 42 adapted to be aligned with exhaust port 34 when the engine is in the forward driving condition.

Axial movement of the sleeves 38 and 39 and the associated exhaust ports 42 and 40 is accomplished by means of a radial extension 43 of sleeve 39 having a circumferentially extending slot 44 therein. An operating arm 45 extends through slot 44 and is interconnected with extension 43 by means of a two-pronged yoke 46 integral with arm 45 which in turn is integral with hub 26. As illustrated in FIGURE 3, circumferentially spaced bridging struts 47 and 48 are provided to connect the sleeves 38 and 39 and also the portion of sleeve 38 at opposite sides of port 42 for axial movement as a unit.

In operation, upon pivotal adjustment of the nozzles 23, arm 45 is also caused to swing so as to shift the sleeves 38 and 39 with their associated exhaust ports 42 and 40 axially by means of the interconnection between extension 43 and yoke 46. When the nozzles 23 are adjusted as in FIGURE 2 to direct a forward driving thrust against blades 19, exhaust ports 34 and 42 are in communication to allow normal axial flow of the motive gases past the rotor blades 20 and 19. During this condition, sleeve 39 overlies ports 37 to close the latter. Upon adjustment of the nozzles 23 to impart a reverse thrust against the blades 19, exhaust port 36 will be open and in communication with port 40 to enable radial exhausting of the motive gases. During this condition, sleeve 38 will overlie port 34 to block axial flow of the motive gases past blades 19. In consequence, the rebound thrust of the motive gases against blades 19 that would otherwise occur is eliminated and the net braking force or reverse thrust against the blades 19 is materially enhanced.

It will be apparent that complete closure of exhaust port 34 will not always be desirable, depending upon the design of the nozzles 23 and blades 19. Accordingly, ports 42 will be located in sleeve 38 so as to provide the desired restriction for exhaust port 34 upon the opening of the radial exhaust ports 37. It is also apparent that it may be desirable to close or restrict ports 37 and 34 independently of each other or to different extents under various operating conditions. For example, a moderate engine braking effect can be obtained, when the rotor 13 is operating at high speed, merely by opening ports 37 while port 34 remains unrestricted. This braking action will occur even through nozzles 23 are not adjusted to a braking position, because the partial exhausting of the motive gases radially through ports 37 will eliminate the forward driving rebound force of these motive gases that would otherwise flow axially past blades 19. It is accordingly apparent that closing of exhaust port 34 will be unnecessary except where rapid braking or actual reverse drive are desired.

Figure 5:
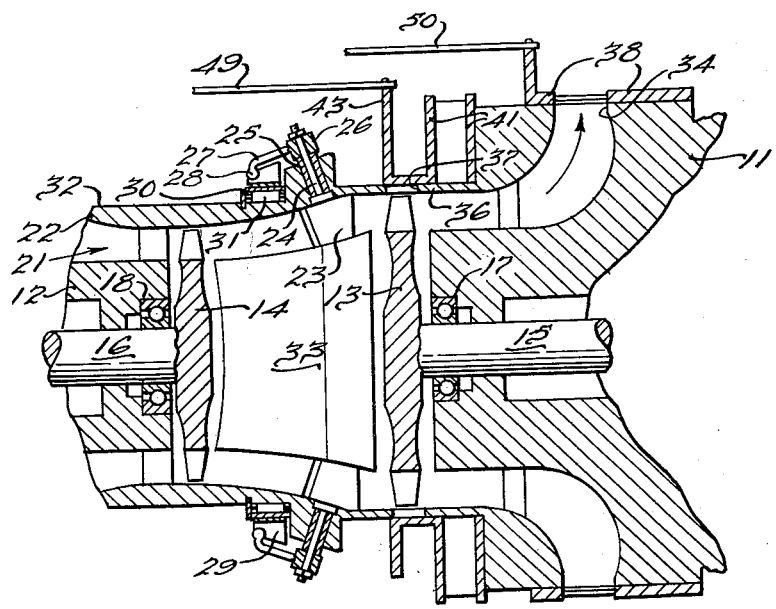
FIGURE 5 is a view similar to FIGURE 4, showing the engine in the forward drive condition.

In the modification illustrated in FIGURES 4 and 5, the swinging control arm 45 is eliminated. Also the connection between the right hand annular wall 41 of radial port 40 and sleeve 38 is eliminated. Thus the sleeves 38 and 39 can be operated independently of each other and nozzles 23. In FIGURES 4 and 5, extension 43 is connected with an operating lever 49, whereas sleeve 38 is connected with an operator 50. The operators 49 and 50 may be operated independently if desired or may be operated conjointly with a fuel throttle or the actuator for the ring 30 to enable selective restriction or opening of the ports 34 and 37 in accordance with any desired operating condition of the engine.

We claim:

1. In a gas turbine engine, a rotor having a plurality of circumferentially spaced blades designed to be driven in a forward rotational direction about the axis of rotation of said rotor by axial flow of motive gases past said blades, gas passage means arranged coaxially with said rotor for conducting said motive gases past said blades in driving relationship therewith, adjustable nozzle means in said gas passage means upstream of said blades for selectively varying the angle of attack of said gases against said blades, said nozzle means being adjustable in a reversing direction for directing said motive gases against said blades to impart a reverse thrust to said blades urging the latter in a reverse rotational direction opposite said forward direction, normally closed exhaust port means arranged in said passage means around the periphery of said blades and being openable to exhaust said gases radially from said blades, and means for opening said port means conjointly with adjustment of said nozzle means in said reversing direction.

2. The combination according to claim 1 including in addition means operable conjointly with adjustment of said nozzle means in said reversing direction for restricting said gas passage means at a location downstream of said blades to reduce the axial flow of said gases past said blades.

3. In a gas turbine engine, a bladed rotor designed to be driven in a forward rotational direction by the flow of motive gases in a predetermined direction past the blades of said rotor, gas passage means arranged for conducting said motive gases in driving relationship past said blades in said predetermined direction, port means arranged in said passage means to exhaust said motive gases from said rotor transversely of said predetermined direction after said gases have initially engaged said blades and before said gases are discharged in said predetermined direction from said blades, thereby to reduce the forward thrust that would otherwise be imparted to said blades by rebound of said gases therefrom in said predetermined direction, adjustable nozzle means in said gas passage means upstream of said blades for selectively varying the angle of attack of said gases against said blades, said nozzle means being adjustable in a reversing direction for directing said motive gases against said blades to impart a reverse thrust to said blades urging the latter in a reverse rotational direction opposite said forward direction, and means for selectively closing said port means.

4. In a gas turbine engine, a bladed rotor designed to be driven in a forward rotational direction by the flow of motive gases in a predetermined direction past the blades of said rotor, gas passage means arranged for conducting said motive gases in driving relationship past said blades in said predetermined direction, port means arranged in said passage means to exhaust said motive gases from said rotor transversely of said predetermined direction after said gases have initially engaged said blades and before said gases are discharged in said predetermined direction from said blades, thereby to reduce the forward thrust that would otherwise be imparted to said blades by rebound of said gases therefrom in said predetermined direction, adjustable nozzle means in said gas passage means upstream of said blades for selectively varying the angle of attack of said gases against said blades, said nozzle means being adjustable in a reversing direction for directing said motive gases against said blades to impart a reverse thrust to said blades urging the latter in a reverse rotational direction opposite said forward direction, means in said gas passage means downstream of said blades for selectively restricting the flow of said motive gases past said blades in said predetermined direction, and means for selectively closing said port means.

5. In a gas turbine engine, a bladed rotor arranged to receive a forward driving thrust from an axial flow of motive gases first impinging against the blades of said rotor and then rebounding therefrom, means for conducting said axial flow of motive gases past said blades to drive the same, means for varying the angle of impingement of said gases against said blades to effect a reverse thrust thereagainst by said impingement, and means for reducing the forward thrust imparted to said blades by said gases rebounding therefrom including means for selectively exhausting at least a portion of said gases radially from said blades after impinging thereagainst.

6. In a gas turbine engine, a bladed rotor arranged to receive a forward driving thrust from an axial flow of motive gases first impinging against the blades of said rotor and then rebounding therefrom, means for conducting said axial flow of motive gases past said blades to drive the same, and means for reducing the forward thrust imparted to said blades by said gases rebounding therefrom including means for selectively exhausting at least a portion of said gases radially from said blades after impinging thereagainst, and also including means for simultaneously restricting said axial flow downstream of said blades.

7. In a gas turbine engine, a bladed rotor arranged to receive a forward driving thrust from an axial flow of motive gases first impinging against the blades of said rotor and then rebounding therefrom, means for conducting said axial flow of motive gases past said blades to drive the same, means for varying the angle of attack of said gases against said blades to effect an initial reverse thrust against said blades by the impingement of said gases thereagainst, and means for reducing the forward thrust imparted to said blades by said gases rebounding therefrom including means for selectively exhausting at least a portion of said gases radially from said blades after impinging thereagainst.

8. In a gas turbine engine, a bladed rotor arranged to receive a forward driving thrust from an axial flow of motive gases first impinging against the blades of said rotor and then rebounding therefrom, means for conducting said axial flow of motive gases past said blades to drive the same, means for varying the angle of attack of said gases against said blades to effect an initial reverse thrust against said blades by the impingement of said gases thereagainst, means for simultaneously reducing the forward thrust imparted to said blades by said gases rebounding therefrom including means for selectively exhausting at least a portion of said gases radially from said blades after impinging thereagainst, and means for simultaneously restricting said axial flow downstream of said blades.

9. In a gas turbine engine, a bladed rotor arranged to receive a forward driving thrust from a predetermined flow of motive gases first impinging against the blades of said rotor and then rebounding therefrom, means for conducting said predetermined flow of motive gases past said blades to drive the same, and means for reducing the forward thrust imparted to said blades by said gases rebounding therefrom including means for selectively exhausting at least a portion of said gases from said blades transversely of said predetermined flow after impinging thereagainst, and means for simultaneously restricting said flow downstream of said blades.

10. In a gas turbine engine, a bladed rotor arranged to receive a forward driving thrust from a predetermined flow of motive gases first impinging against the blades of said rotor and then rebounding therefrom, means for conducting said predetermined flow of motive gases past said blades to drive the same, means for varying the initial angle of impingement of said gases against said blades to effect a reverse thrust thereagainst by said impingement, and means for reducing the forward thrust imparted to said blades by said gases rebounding therefrom including means for selectively exhausting at least a portion of said gases from said blades transversely of said predetermined flow after impinging thereagainst.

11. The combination according to claim 10 including means for selectively restricting said predetermined flow downstream of said blades simultaneously with the transverse exhausting of said flow.

References Cited in the file of this patent

UNITED STATES PATENTS

| 2,388,975 | Jefferson | Nov. 13, 1945 |
| 2,820,341 | Amann | Jan. 21, 1958 |
| 2,874,926 | Gaubatz | Feb. 24, 1959 |
| 2,945,672 | Wagner | July 19, 1960 |
| 2,988,327 | Trowbridge | June 13, 1961 |

FOREIGN PATENTS

| 879,280 | Germany | June 11, 1953 |